(12) United States Patent
Kumar K N et al.

(10) Patent No.: US 10,340,731 B2
(45) Date of Patent: Jul. 2, 2019

(54) SYSTEM AND METHOD FOR PRESERVING BACK-UP BATTERY FOR IMPROVED BACK-UP AVAILABILITY

(71) Applicant: Honeywell International Inc., Morris Plains, NJ (US)

(72) Inventors: Dinesh Kumar K N, Bangalore (IN); Aravind Hulisandra Sathyanaryana Rao, Bangalore (IN); Wolfgang Bleier, Bürstadt (DE)

(73) Assignee: Honeywell International Inc., Morris Plains, NJ (US)

( * ) Notice: Subject to any disclaimer, the term of this patent is extended or adjusted under 35 U.S.C. 154(b) by 349 days.

(21) Appl. No.: 15/057,633

(22) Filed: Mar. 1, 2016

(65) Prior Publication Data

US 2017/0256982 A1 Sep. 7, 2017

(51) Int. Cl.
*H02J 7/00* (2006.01)
*H02J 9/00* (2006.01)
*H02J 9/06* (2006.01)
*H02J 1/10* (2006.01)

(52) U.S. Cl.
CPC ............... *H02J 9/06* (2013.01); *H02J 1/108* (2013.01); *H02J 7/0063* (2013.01); *H02J 9/061* (2013.01)

(58) Field of Classification Search
CPC .. H02J 9/06; H02J 7/0063; H02J 1/108; H02J 9/061
USPC .......................................................... 307/66
See application file for complete search history.

(56) References Cited

U.S. PATENT DOCUMENTS

| | | | |
|---|---|---|---|
| 5,148,042 A | * | 9/1992 | Nakazoe ............... G06F 1/1616 307/150 |
| 5,341,034 A | | 8/1994 | Matthews |
| 5,399,956 A | | 3/1995 | DeLuca et al. |
| 5,604,708 A | | 2/1997 | Helms et al. |
| 5,784,629 A | | 7/1998 | Anderson et al. |
| 5,835,366 A | | 11/1998 | Pleso et al. |
| 6,204,573 B1 | | 3/2001 | Green et al. |
| 6,425,461 B1 | | 7/2002 | Wang |
| 6,892,147 B2 | | 5/2005 | Bui et al. |
| 7,622,226 B2 | | 11/2009 | Takahashi |
| 7,768,756 B2 | * | 8/2010 | Huang ................... H02J 9/061 307/64 |
| 8,179,094 B2 | | 5/2012 | Anupindi et al. |
| 8,421,276 B2 | | 4/2013 | Belz |

(Continued)

OTHER PUBLICATIONS

"Equipment for potentially explosive atmospheres (ATEX)," http://ec.europa.eu/growth/sectors/mechanical-engineering/atex, printed Jan. 23, 2016, 2 pages.

(Continued)

*Primary Examiner* — Richard Tan

(57) ABSTRACT

A battery management system comprising a main battery and a backup battery. A load is electrically connected to the main battery and the backup battery through one or more switches (e.g., FET switches). A voltage monitoring circuit is electrically connected to the main battery, the backup battery, and the load, wherein the voltage monitoring circuit monitors a voltage from the main battery and triggers a changeover to the backup battery based on a threshold and wherein a main battery interface path within the circuit is facilitated by a bypass diode for automatically switching the circuit to avoid power interruptions.

15 Claims, 3 Drawing Sheets

(56) References Cited

U.S. PATENT DOCUMENTS

| | | | |
|---|---|---|---|
| 8,941,264 B2 | 1/2015 | Scruggs et al. | |
| 9,065,277 B1 | 6/2015 | Kim et al. | |
| 9,214,833 B1 | 12/2015 | Kim et al. | |
| 9,225,006 B2 | 12/2015 | Fujiki et al. | |
| 9,240,578 B2 | 1/2016 | Kim | |
| 9,240,617 B2 | 1/2016 | Kim | |
| 9,240,701 B2 | 1/2016 | Takahata | |
| 2003/0210014 A1* | 11/2003 | Jabaji .................... | H02J 7/0031 320/104 |
| 2015/0380952 A1* | 12/2015 | Brandt ................ | H01M 10/441 320/119 |

OTHER PUBLICATIONS

"Diode-or circuit," Wikipedia, the free encyclopedia, printed Jan. 23, 2016, 1 page.

\* cited by examiner

SYSTEM AND METHOD FOR PRESERVING BACK-UP BATTERY FOR IMPROVED BACK-UP AVAILABILITY

TECHNICAL FIELD

Embodiments are related to power management circuits. Embodiments are also related to electronic devices and secondary or battery back-up circuits.

BACKGROUND

Oil and natural gas industry products, like many other electronics products, utilize a wide range of electrical and electromechanical machines and products, many of which are installed in hazardous locations including explosive atmospheric environments. A potentially explosive atmosphere exists when a mixture of air gases, vapors, mists, or dusts combine in a manner that may ignite under certain operating conditions. Equipment and protective systems intended for use in potentially explosive atmospheres (e.g., ATEX/IEC) cover a range of products, including those utilized in, for example, fixed offshore platforms, petrochemical plants, mines, and flour mills, amongst others. Products implemented in such conditions are defined by ATEX standards.

Many of these products are battery operated and support main power configurations as well as battery power. In certain cases, especially for products which need to preserve functionality and/or data, a back-up battery option may be required to ensure on-process changing of a main-battery while continuing operations during a main power outage. In some situations, two batteries may be utilized. That is, one battery may serve as a main battery and a second battery may function as a back-up battery for the main battery.

In most prior art designs, a main battery is assisted by a back-up battery to provide uninterrupted power to the load. In such situations, a diode-based scheme is primarily utilized because such a scheme in general is relatively easy to implement. A general observation can be made that battery monitoring/management devices available in the market consume very high currents for their own operations. Conserving this leaky current becomes very critical in battery-operated devices, which are expected to last in some cases for many years. The use of complex devices for critical functions such as dealing with two or more power sources makes such devices difficult to qualify, for example, for Ex (Explosive Protection) requirements (e.g., hazardous area certifications). In such cases, a general recommendation is to utilize simple devices such as a diode, FET (Field Effect Transistor), etc.

FIG. 1 illustrates a prior art schematic diagram depicting a standard main and back-up battery circuit 10. The configuration of circuit 10 shown in FIG. 1 is based on a diode arrangement. In the circuit arrangement shown in FIG. 1, a main battery 12 is electrically connected to ground 13 and a diode 14. A back-up battery 16 is electrically connected to a diode 18, which in turn is electrically connected to the diode 14 and to a load 20. Diode-based solutions such as circuit 10 depicted in FIG. 1 come with a built-in disadvantage because in such devices, the discharge rate is low and the life of the main battery 12 is expected to be long (e.g., at least several years). This issue is particularly evident when both batteries are of the same type. In some arrangements, the diodes 14 and 18 can form a DIODE OR network or circuit. Such a DIODE OR network or circuit can be utilized to isolate two or more voltage sources and also in some implementations to derive a simple Boolean logic function.

This type of circuit is subject to the following operations. First, as the main battery discharges and the voltage falls below the voltage of the back-up battery 16, the back-up battery 16 will kick in through a DIODE OR network. Then, as the back-up battery 16 discharges and the voltage falls below that of the main battery 12, the main battery 12 can kick-in through the DIODE OR network. These operations can happen in a back and forth manner and the order at which this occurs depends very much on several factors such as discharge rate, battery ambient temperature, the battery technology, and so forth.

FIG. 2 illustrates prior art graphs 22 and 24, respectively, depicting data indicative of short-term discharge characteristics and long-term discharge characteristics of the example circuit 10 shown in FIG. 1. As a result of the operations described above, the back-up battery 16 begins losing back-up energy along with that of the main battery 12. However, the design intent is to preserve the back-up energy to supply sufficient energy in the absence of main energy. Thus, there may be a state where back-up battery 16 is not in any better state than the main battery 12 and not be in a position to take over from the main battery 12 during an unexpected power outage from the main battery 12.

FIG. 3 illustrates an example graph 30 depicting the battery characteristics of a sample Thionyl Chloride Lithium Battery utilized in an experimental embodiment. Note that these are 3.6V non-rechargeable batteries. The discharge of these batteries is very steep during the last part of the cycle and this is where above-mentioned issues become a concern. The voltage and/or discharge profile varies with temperature also.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an, improved back-up battery circuit.

It is another aspect of the disclosed embodiments to provide for a back-up battery circuit having a minimum leakage current to ensure a long battery operating life.

It is also an aspect of the disclosed embodiments to provide for a back-up battery circuit with no power interruption during a changeover operation.

The aforementioned aspects and other objectives and advantages can now be achieved as described herein. A battery management system and method are disclosed which includes a main battery and a backup battery. A load is electrically connected to the main battery and the backup battery through at least one switch—(e.g., FET switches). A voltage monitoring circuit is electrically connected to the main battery, the backup battery, and the load, wherein the voltage monitoring circuit monitors a voltage from the main battery and triggers a changeover to the backup battery based on a threshold and wherein a main battery interface path within the circuit is facilitated by a bypass diode for seamless switching the circuit to avoid power interruptions.

In an example embodiment, the voltage monitoring circuit can be configured with the ability to judge the battery profile/condition, based on various physical variables such as temperature, which can affect the threshold voltage to switchover to the backup battery. The voltage monitoring circuit can also monitor the voltage of the backup battery to ensure and inform the system that the backup battery is in good condition and can be utilized during a power outage. The voltage monitoring circuit can further keep track of the amount of backup battery used up during a power outage/switchover and indicate whether the backup battery is healthy or needs to be replaced.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one, or more" as used herein, depending at least in part upon context, may be used to describe any feature, structure, or characteristic in a singular sense or may be used to describe combinations of features, structures, or characteristics in a plural sense. Similarly, terms such as "a", "an", or "the" again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
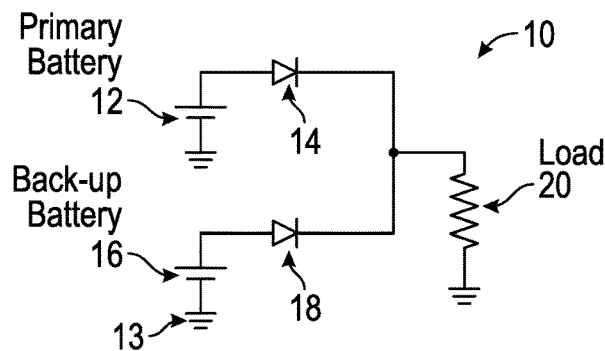
FIG. 1 illustrates a prior art schematic diagram depicting a standard main and back-up battery circuit.
Figure 2:
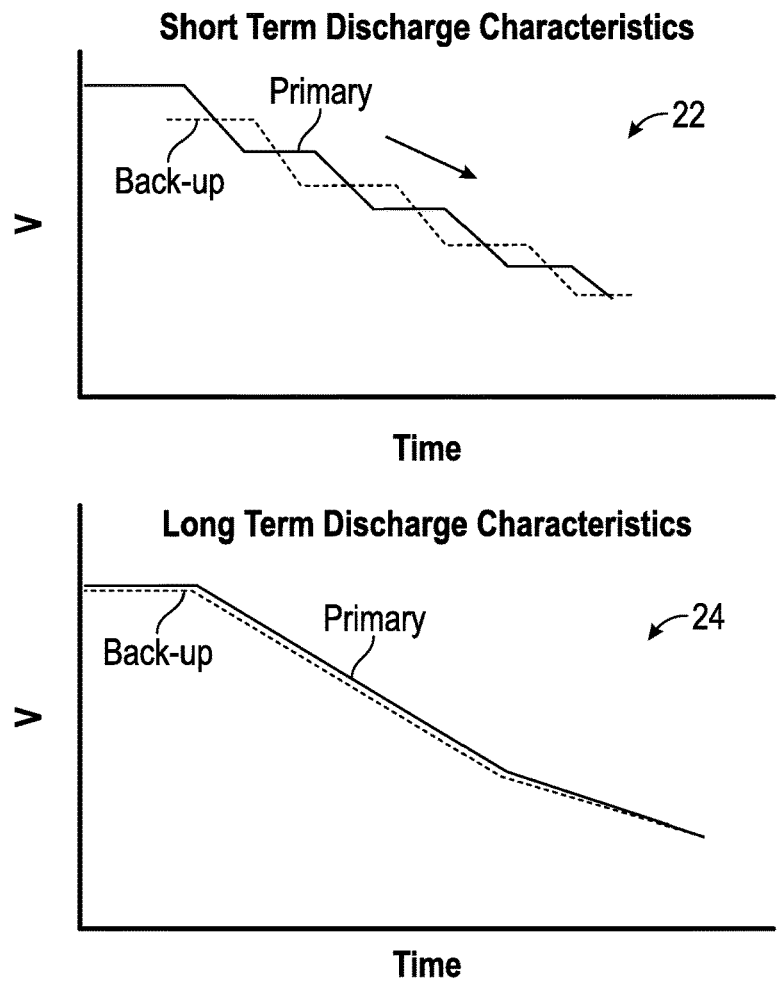
FIG. 2 illustrates prior art graphs respectively depicting data indicative of short term discharge characteristics and long term discharge characteristics of the example circuit shown in FIG. 1.
Figure 3:
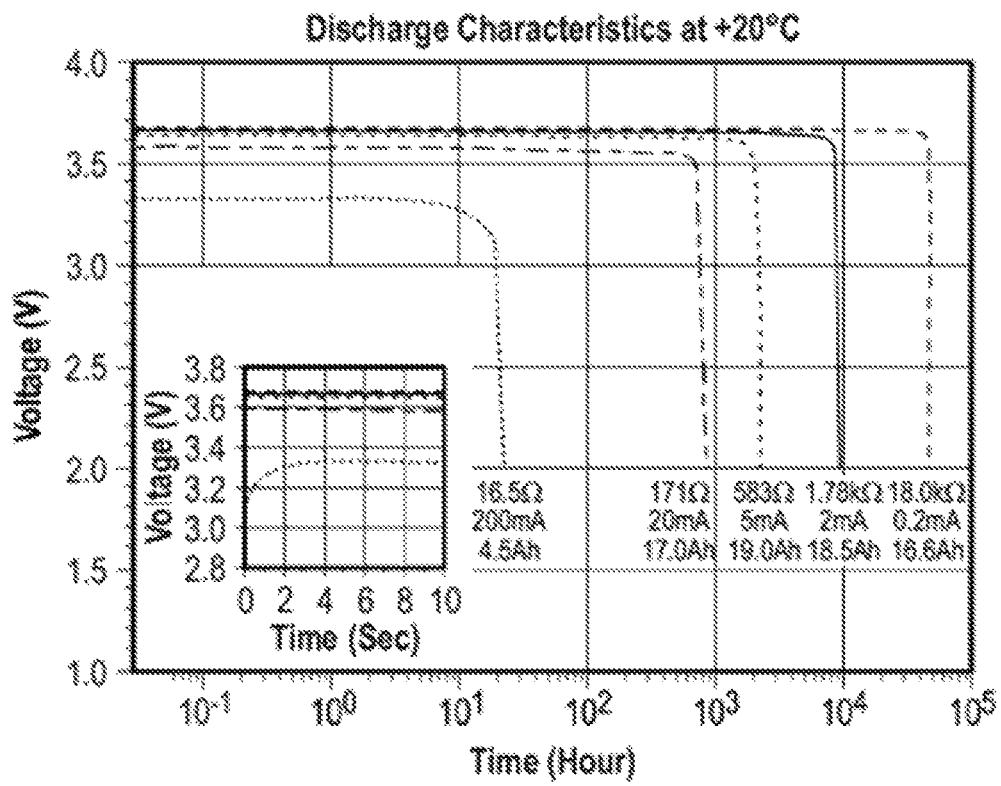
FIG. 3 illustrates an example graph depicting the battery characteristics of a sample thionyl chloride lithium battery.
Figure 4:
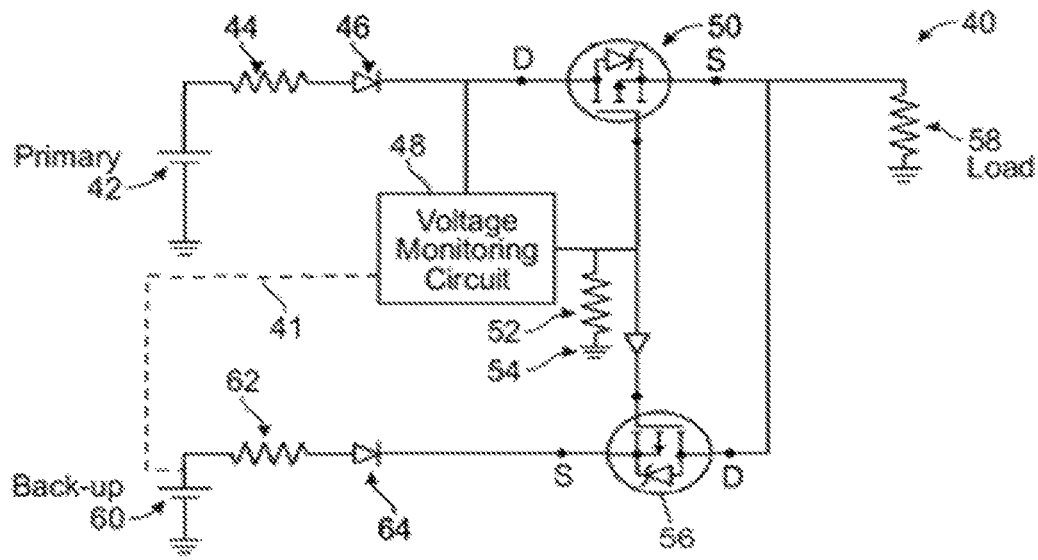
FIG. 4 illustrates a schematic diagram of a battery management circuit, in accordance with an example embodiment.

FIG. 4 illustrates a schematic diagram of a battery management circuit 40, in accordance with an example embodiment. The circuit 40 includes a main battery 42 and secondary or backup battery 60. Note that the main battery 42 and the backup battery can be of any chemistry, re-chargeable, or otherwise. As shown in the example in FIG. 4, the main battery 42 connects electrically to resistors 44, 48, 54, etc., which are optional and context specific. That is, in some embodiments, fewer or more resistors may be utilized, depending upon the design and context of the product or application in which the battery management circuit is implemented.

Thus, in the example embodiment shown in FIG. 4, the main battery 42 is electrically connected to the resistor 44, which in turn is connected electrically to a diode 46.

A low leakage voltage monitoring circuit 48 is connected electrically to the diode 46 and to a switch 50, which in some example embodiments may be an FET switch. The low leakage voltage monitoring circuit 48 is further connected electrically to a resistor 52 that is electrically connected to ground 54 and the switch 50. A load 58 connects electrically to the switch 50 and another switch 56, which in some embodiments may also be an FET switch.

The switch 56 is connected electrically to the resistor 52 and the switch 50. The switch 56 and the switch 50 further connect electrically to the load 58. A back-up battery 60 connects electrically to a resistor 62, which in turn is connected electrically to a diode 64, which in turn connects, electrically to the switch 56.

The low leakage voltage monitoring circuit 48 (e.g., a voltage supervisory device) activates or deactivates switches 50 and 56 for main and back-up battery paths within the context of circuit 40. The leakage in the example circuit 40 is estimated to be very low through the voltage supervisory device or circuit 48. It can be appreciated that although switches 50 and 56 in the embodiment of circuit 40 shown in FIG. 4 may be implemented as FET switches, other types of switches (e.g., non FET switches) can be utilized in other embodiments. The disclosed embodiments are not limited to the use of only FET switches such as FET switches.

Assume the control output of the supervisory circuit is made of use by the circuit 40, at power ON the supervisory circuit 48 can delay the control signal by a few 100s of mS. During this time the body diode of the FET, for example, in the main path will ensure the current to toad. Once the supervisory circuit 48 is active, it switches ON the main FET if the voltage levels from main battery are above a threshold.

A control signal from the voltage supervisory to the back-up FET switch 56 can be reversed so that the back-up circuit is OFF whenever the main circuit is ON.

With the configuration of circuit 40, the back-up battery 80 will not kick-in until the supervisory circuit 48 detects a low threshold from the main battery 42. Once the main battery 42 reaches the lowest threshold (which will happen as it reaches near end of life), the supervisory circuit 48 will trigger the changeover. This changeover will go without any interruption to the load current because of presence of the body diode associated with the main switch 50. Note that in FIG. 4, dashed line 41 is also shown from the voltage monitoring circuit to the backup battery 60, which indicates that in an alternative arrangement or embodiment of circuit 40, the voltage monitoring circuit 48 can be employed for monitoring the backup battery 80.

Note that the switch 50 associated with the main or, primary circuit within circuit 40 can be used to avoid/minimize reverse charging and reverse voltage with respect to the main battery 42. If the primary or main battery 42 is resilient, switching the secondary or back-up switch 56 may be sufficient.

The diode 46 ensures current flow from the main battery 42 even when the FET is OFF. From this point onwards there can be back and forth switching between the main battery 42 and the back-up battery 60 based on several factors such as battery technology, discharge rate, etc., but by then the main battery 42 would have gone to a near dead state and served the device for expected duration in the field.

Note that the diode 46 or 64 is always presenting a path for flow. However, when a switch is present the current takes the least resistant path. Thus, when the switch is open, the current takes the diode path. Although the diode is lossy, this is still a better arrangement than completely losing power during switching. Note that a designer can in some embodiments utilize a dedicated diode across the source and drain of the FET if the usage of the aforementioned body diode is not acceptable.

Note that in some example embodiments, the voltage monitoring circuit 48 can be configured with the ability to judge the battery profile/condition, based on various physical variables such as temperature, which can affect the threshold voltage to switchover to backup battery. The voltage monitoring circuit 48 can also monitor the voltage of the backup battery to ensure and inform the system that the backup battery is in good condition and can be utilized during a power outage. The voltage monitoring circuit 48 can further keep track of the amount of backup battery used up during, for example, a power outage/switchover.

Note that although there is some discussion herein regarding hazardous location products such as those utilized in potentially explosive atmospheres (e.g., ATEX/IEC), the disclosed embodiments are not limited only to such hazardous locations. That is, the disclosed embodiments are applicable to any electronic product (e.g., home, commercial, or industrial), which includes a battery backup power system.

Figure 5:
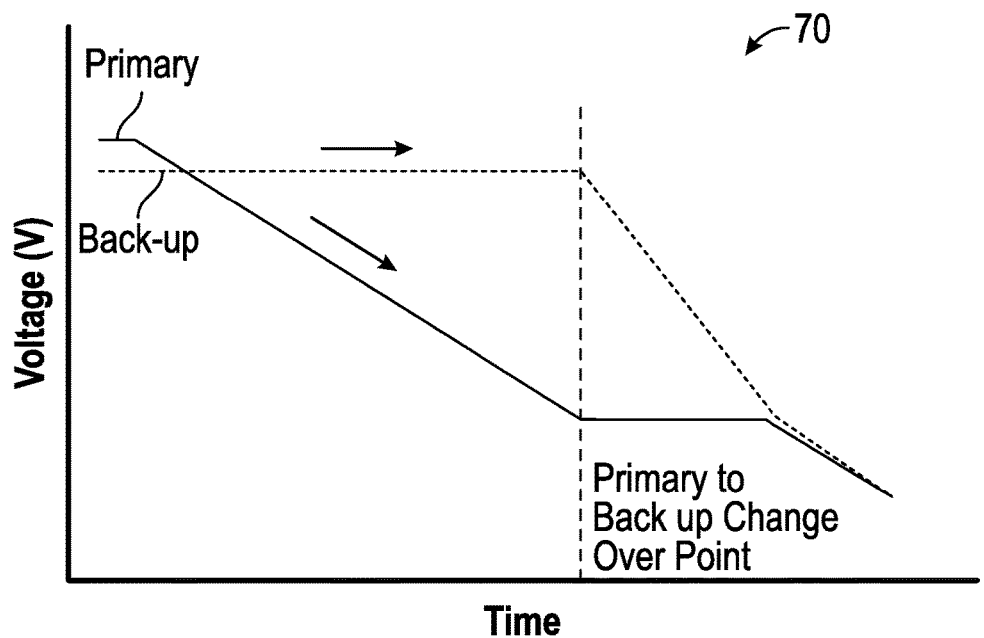
FIG. 5 illustrates a graph depicting data indicative of longer discharge characteristics for a circuit such as the circuit depicted in FIG. 4, in accordance with an example embodiment.

FIG. 5 illustrates a graph 70 depicting data indicative of longer discharge characteristics for a circuit such as the circuit 40 depicted in FIG. 4, in accordance with an example embodiment. Graph 70 depicts voltage data versus time to derive plot indicating long-term discharge characteristics. Graph 70 indicates an improvement in the overall performance as achieved by the disclosed embodiments. Graph 70 demonstrates that when the main battery 42 goes down (e.g., a situation where main battery met the end of life in the field after a long term discharge or a removal or a defect of main battery itself causing changeover to back-up), the back-up battery 60 takes over as expected and sufficient energy is preserved in the back-up battery 60 because of this scheme.

Based on the foregoing, it can be appreciated that a number of embodiments, preferred and alternative, are disclosed herein. For example, in an example embodiment, a battery management system or circuit 40 can be implemented, which includes, for example, a primary or main battery 42 and a secondary or backup battery 60. In such an embodiment, a load 58 can be electrically connected to the main battery 42 and the backup battery 80 through one or more switches, such as, for example, switches 50 and 56. The battery management system or circuit 40 can further include a voltage monitoring circuit 48 electrically connected to the main battery 42, the backup battery 60, and the load 58.

The voltage monitoring circuit 48 monitors the voltage from the main battery 42 and triggers a change over to the backup battery 60 based on a threshold. The main battery interface path within the circuit 40 is facilitated by a bypass diode for automatically switching the circuit to avoid power interruptions. The threshold of the voltage monitoring circuit is dynamically tunable to factor external variables such as, for example, temperature, the age of the battery, etc. The health of the secondary or backup battery 80 can also be monitored in some example embodiments to ensure its availability during a time of need.

In another example embodiment, a battery management method can be implemented. Such a method can include steps or operations, such as, for example: connecting the load 58 electrically to the main battery 42 and the backup battery 60 through two or more switches, such as, for example, switches 50, 56; electrically connecting the voltage monitoring circuit 48 to the main battery 42, the backup battery 60, and the load 58; monitoring with the voltage monitoring circuit 48, a voltage from the main battery to trigger a change over to the backup battery 60 based on a threshold; and electrically facilitating a main battery interface path within the circuit 40 utilizing a bypass diode so as to seamlessly switch the circuit 40 to avoid power interruptions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A battery management system, comprising:
a main battery and a back-up battery;
a load electrically connected to:
   a main battery through a first switch, a first resistor and a first diode in series;
   a back-up battery through a second switch, a second resistor and a second diode in series; and
a voltage monitoring circuit electrically connected to said main battery, said back-up battery and the load, wherein said voltage monitoring circuit monitors a voltage from said main battery and triggers a changeover to said back-up battery based on a low threshold voltage, establishing a main battery interface path by a diode for switching between the main battery and the back-up battery to avoid power interruptions, wherein the low threshold voltage of said voltage monitoring circuit is dynamically tunable to factor external variables.

2. The system of claim 1 wherein said first diode associated with the main battery in the main battery interface path is connected electrically to said first switch.

3. The system of claim 1 wherein said back-up battery is connected electrically and in series with said second diode is connected electrically to said second switch that is associated with said back-up battery.

4. The system of claim 3 wherein said voltage monitoring circuit comprises a low leakage voltage monitoring circuit.

5. The system of claim 3 wherein a health of said back-up battery is monitored to ensure an availability of said back-up battery during a time in which said back-up battery is needed.

6. A battery management method, comprising:
connecting a load electrically to:
a main battery through a first switch, a first resistor and a first diode in series;
a back-up battery through a second switch, a second resistor and a second diode in series;
electrically connecting a voltage monitoring circuit to said main battery, said back-up battery, and said load;
monitoring with said voltage monitoring circuit, a voltage from said main battery to trigger a changeover to said back-up battery based on a low threshold; and
wherein a main battery interface path is established by utilizing a diode for switching between the main battery and the back-up battery to avoid power interruptions, wherein the low threshold of said voltage monitoring circuit is dynamically tunable to factor external variables.

7. The method of claim 6 further comprising electrically connecting said main battery to the first diode, wherein said first diode is connected electrically to said first switch associated with said main battery in said main battery interface path.

8. The method of claim 6 further comprising electrically connecting said back-up battery to a third diode, wherein said third diode is connected electrically to said second switch associated with said back-up battery.

9. The method of claim 6 wherein said voltage monitoring circuit comprises a low leakage voltage monitoring circuit.

10. The method of claim 6 further comprising monitoring a health of said back-up battery to ensure an availability of said back-up battery during a time in which said back-up battery is needed.

11. A battery management circuit, comprising:
a load electrically connected to:
a main battery through a first switch, a first resistor and a first diode in series;
a back-up battery through a second switch, a second resistor and a second diode in series; and
a low leakage voltage monitoring circuit is electrically connected to said main battery, said backup battery, and said load, wherein said low leakage voltage monitoring circuit monitors a voltage from said main battery and triggers a changeover to said backup battery based on a low threshold and wherein a main battery interface path is connected by a bypass diode for automatically switching between the main battery and the back-up battery to avoid power interruptions, wherein the low threshold of said voltage monitoring circuit is dynamically tunable to factor external variables.

12. The circuit of claim 11 wherein:
said battery management circuit comprises a main circuit and a back-up circuit, said main circuit including said first switch and said back-up circuit including said second switch; and
a control signal from said low leakage voltage monitoring circuit to said second switch is reversed so that said back-up circuit is off whenever said main circuit is on.

13. The circuit of claim 11 wherein said main battery is connected electrically and in series with the first resistor and wherein said first resistor is connected electrically to said first diode and wherein said first diode is connected electrically to said first switch associated with said main battery in said main battery interface path.

14. The circuit of claim 11 wherein said back-up battery is connected electrically and in series with the second resistor and wherein said second resistor is connected electrically to said second diode, wherein said second diode is connected electrically to said second switch associated with said back-up battery.

15. The circuit of claim 11 wherein a health of said back-up battery is monitored to ensure an availability of said back-up battery during a time in which said back-up battery is needed.

* * * * *